United States Patent [19]

Codde

[11] Patent Number: 5,154,274
[45] Date of Patent: Oct. 13, 1992

[54] UNIVERSAL DISCHARGE PUSHER

[75] Inventor: Christopher L. Codde, Coarsegold, Calif.

[73] Assignee: FMC Corporation, Chicago, Ill.

[21] Appl. No.: 753,493

[22] Filed: Sep. 3, 1991

[51] Int. Cl.5 .............................................. B65G 47/26
[52] U.S. Cl. .................................. 198/456; 198/468.11
[58] Field of Search ............... 198/456, 457, 432, 433, 198/372, 468.9, 468.11, 468.1, 468.01, 705

[56] References Cited

U.S. PATENT DOCUMENTS 2,115,255  4/1938  David et al. ..................... 198/457 X
2,708,021  5/1955  Meyer ............................. 198/433 X
3,409,115  11/1965  Porcaro ........................... 198/456 X
3,604,319  9/1971  Hirahara ......................... 198/482.1 X

FOREIGN PATENT DOCUMENTS 498759  2/1951  France ................................. 198/456

Primary Examiner—Robert P. Olszewski
Assistant Examiner—Cheryl L. Gastineau
Attorney, Agent, or Firm—R. C. Kamp; R. B. Megley

[57] ABSTRACT

An apparatus and a method of laterally conveying, systematically off-loading and sequentially transferring articles utilizing a coordinated movement of oscillating fingers with that of an indexing conveyor wherein the fingers are adjustably located to accommodate universal sizes and shapes of containers.

9 Claims, 1 Drawing Sheet

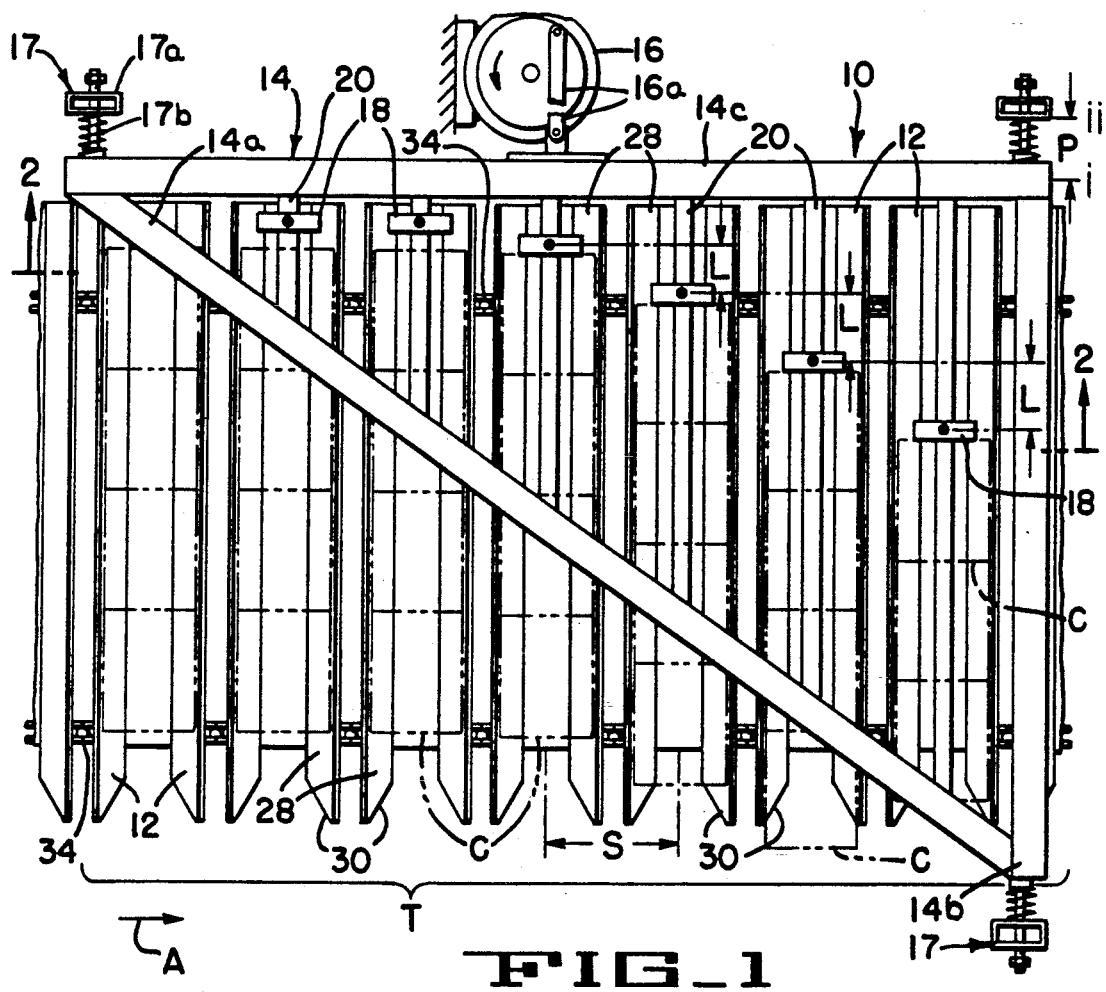
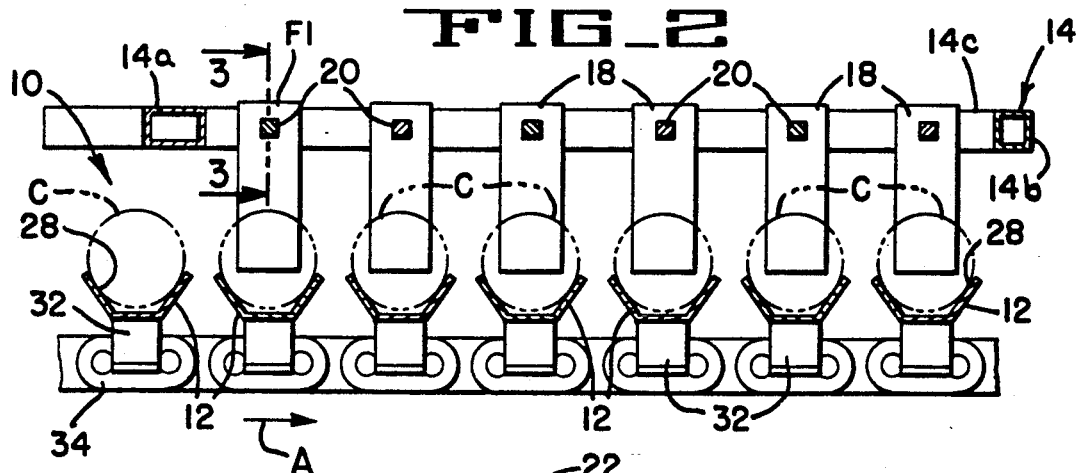
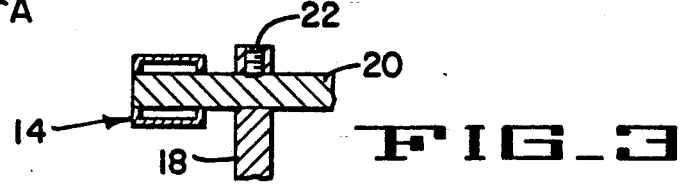

UNIVERSAL DISCHARGE PUSHER

BACKGROUND OF THE INVENTION

Field of the Invention

The present invention relates to a conveying and transfer system for articles such as glass jars and containers, and more particularly to such a system which changes the path of articles of various sizes and shapes during conveyance.

SUMMARY OF THE INVENTION

The present invention relates to apparatus and method for laterally conveying, systematically off-loading and sequentially transferring articles of variable sizes and shapes. The apparatus comprises a conveyor for conveying the articles which are supported on a carrier means secured to the conveyor. Further, a structural frame means spaced above the conveyor is placed to oscillate using an oscillation means. A plurality of finger means supported by the structural frame means are sued to urge articles off the conveyor along a path different from the path of the conveyor.

Further, the invention relates to an apparatus for laterally conveying, systematically off-loading and sequentially transferring articles of variable sizes and shapes from a conveyor system. The system comprises a conveyor means for conveying the articles and a carrier means, secured on the conveyor means, to support the articles. An oscillation means is used to oscillate a structural frame means. A plurality of finger means having slidably adjustable connections hang from the members of the structural frame means. The system also includes means for adjusting the lateral distance between the plurality of the finger means.

Particularly, the present invention relates to a method of laterally conveying, systematically off-loading and sequentially transferring articles of variable sizes and shapes from a conveyor system. The method comprises the steps of depositing articles in lateral arrays along the length of the conveyor. By indexing the conveyor, an intermittent lengthwise movement of the articles is achieved. Moreover, by oscillating a structural frame means to provide a pulsating lateral movement, the articles are moved laterally using finger means which hang from the structural frame means. The adjustment of the lateral distance between the depending finger means enables a method of off-loading articles of different sizes and dimensions.

BRIEF DESCRIPTION OF THE DRAWINGS

FIG. 1 is a plan view of an embodiment of the invention.

FIG. 2 is a fragmentary section taken along the line 2—2 of FIG. 1.

FIG. 3 is a fragmentary section taken along the line 3—3 of FIG. 2.

DESCRIPTION OF THE PREFERRED EMBODIMENT

The apparatus and method of the present invention comprises an indexing conveyor 10 (FIG. 1), on which a multiplicity of carrier means 12 are securely mounted. A structural frame means 14, is spaced above the conveyor 10. The structural frame means 14, spans across the width and extends over a longitudinal segment of the conveyor 10. An oscillation means 16 such as an adjustable reciprocating motor driven unit with a link 16a is connected to drive the structural frame means 14.

As illustrated in FIGS. 1 and 2, each carrier means 12, has a wide generally U-shaped inner portion 28 to support articles that are being conveyed. Further, the carrier 12 has open ends 30 to allow the lateral ingress and egress of the articles. Each carrier means 12 is connected to two endless chains 34 in conveyor 10 means of a clip angle 32 such that the carrier means 12 can move endlessly along the upper reach of conveyor 10 in the direction of the arrow "A" in synchronism with the intermittent movement of the conveyor 10.

An important feature of the invention is the use of a plurality of finger means 18, supported by the structural frame means 14, to urge the articles "C" laterally off the conveyor 10. Specifically, the finger means 18 are adjustably suspended from secondary members 20. More specifically, the finger means 18 are suspended substantially parallel to each other as seen in FIG. 2. The finger means 18 are also adjustably located to have a lateral distance L, relative to each other, as best seen in FIG. 1. The finger means 18 are also equally spaced from each other along the length of conveyor 10 at a distance "S" (FIG. 1), which is equal to the spacing between the carrier means 12. As discussed in more detail below, this adjustable feature of the finger means 18, and their concentric position relative to the carrier means 12 enables the apparatus to handle articles of variable sizes and shapes.

Referring now to FIG. 1 in more detail, another important feature of the intention is the use of an oscillating structural frame means 14 with secondary members 20, which secure and support the depending finger means 18. The structural frame means 14 is generally triangular in shape and consists of a member 14a diagonally positioned across conveyor 10. Structural member 14b is placed vertically across the width of conveyor 10 whereas structural member 14c is positioned along the length of conveyor 10. The structural frame means 14 has a plurality of secondary members 20, which are substantially parallel to each other and are connected to the structural frame means 14 at structural members 14a and 14c. The structural frame means 14 is supported by a plurality of support structures 17. The support structure 17 consists of a vertical column 17a connected to the structural frame 14 by means of a spring loaded connector 17b, to allow oscillatory movement of the frame structure 14 and to keep it positioned above conveyor 10 (See FIG. 2).

The structural frame means 14 is oscillated using a rotary disk motor 16 or an equivalent device. The rotary disk motor 16 is linked to the structural frame means 14 by means of a link arm 16a. The rotary disk motor 16 induces a pull-push force on the structural frame means 14. Since the support structures 17 provides a non-rigid spring loaded connection 17b, the structural frame means 14 oscillates in response to the pull-push force. The oscillation ranges between positions "i" and "ii". The frequency of the oscillation through pitch "P" is adjustable by varying the speed of the rotary disk motor 16.

As discussed hereinbefore, the finger means 18 are suspended from the secondary members 20. Consequently, when the structural frame means 14 oscillates, the finger means 18 oscillate as well. The most significant aspect of this invention is the use of the finger means 18 to urge articles off the conveyor in a lateral direction. More particularly, the finger means 18 are slidably secured on the secondary members 20, using a set screw or an equivalent fastener means 22 (refer to FIG. 3). The set screw 22 is placed through a drill hole on top of the finger means 18 to engage the secondary member 20. At the top end, the finger means 18 forms a collar around the secondary member 20 such that when the set screw 22 is loose, the finger means 18 can slide across the length of the secondary member 20. Consequently, the lateral distance "L" between the finger means 18 can be adjusted as needs. This adjustable feature enables the apparatus to handle articles of different sizes and shapes. For example, setting the lateral distance "L" between the finger means 18, to equal the length of article "C" enables the apparatus to urge a column of articles of length "C" laterally. Moreover, by adjusting the speed of the rotating disk motor 16, the frequency of the oscillation of the structural frame 14 can be varied. This feature in conjunction with the adjustability of the finger means 18, enables the apparatus to handle variable flow rates of articles "C" on conveyor 10 such that the articles "C" are pulsatingly moved laterally as the structural frame 14 oscillates a distance equal to the pitch "P".

Further, the most significant feature of this invention is the combination and coordination of an oscillatory movement with the indexing or intermittent movement of conveyor 10 to transfer articles laterally through transfer positions "T". Initially, conveyor 10 moves forward for a distance "S" and its movement is interrupted temporarily. The structural frame means 14 is oscillated by the rotary motor 16, to the furthest point of the pitch, i.e. "ii", synchronous with the initial forward movement of conveyor 10 in the direction of arrow "A". Further, the lateral distance between the fingers 18 is present at equal the length of the article "C" to be transferred, and the first finger 18 is positioned to clear the conveyor when the structural frame means 14 moves to its furthest point "ii". This ensures the engagement of the finger means 18 with the articles at the outermost edge of carrier 12 when the structural frame means 14 oscillates back to pitch position "i".

Referring now to FIG. 2 in more detail, a detailed arrangement of the finger means 18 is shown engaging articles "C" on carrier 12. The finger means 18 comprises of generally flat surfaces with a thickness to provide sufficient rigidity to push a column of articles "C". Moreover, as mentioned hereinbefore, the finger means 18 are suspended concentric with the carrier means 12 such that articles "C" are engaged and contacted at their centers by the finger means 18. Further, the lateral distance between the finger means 18 is adjusted to one article "C" length. This arrangement enables the apparatus to systematically off-load and sequentially transfer articles "C". Particularly, the oscillation pitch "P" is adjustable between "i" and "ii". Generally, the pitch is adjusted to one article "C" length. Thus, when the structural frame means 14 is at its furthest point "ii", the first finger means "F1" is at least one article length away from the side edge of conveyor 10, opposite the transfer side "T". Accordingly, when the structural frame means 14 oscillates back to position "i", the first finger means "F" pushes an article, located at the outer most edge of conveyor 10, one article length laterally forward toward transfer position "T". Similarly, the other and adjacent finger means 18 push articles a distance of one article length laterally toward transfer side "T". Consequently, articles of variable sizes and shapes are systematically off-loaded and sequentially transferred through transfer positions "T".

Referring now to FIGS. 1, 2 and 3, initially, the structural frame means 14 is moved to position "ii". At this position, the first finger "F1" is clear off the edge of conveyor 10. Conveyor 10 is indexed to move forward a distance equal to "S", in the direction of arrow "A". As soon s conveyor 10 comes to rest, the structural frame means 14 is moved back to position "i". At this point, either the first finger means "F1" or any one of the adjacent finger means 18 engages article "C" and advances it laterally forward a distance equal to the length of the article. Assuming a column of articles in carrier 12, when the first article is pushed laterally forward it will urge the article immediately next to it to slide forward as well. Consequently, articles are pushed laterally forward toward the transfer side "T" of conveyor 10. Thus, articles are laterally conveyed. Moreover, since each complete cycle of indexation and oscillation results in the lateral movement of articles equal to a present length of one article "C", one cycle of operation of the apparatus results in the transfer of "One" article "C" at each of the outlets 30 through the transfer side "T" of conveyor 10. This feature of the present invention enables a sequential transfer of articles.

Accordingly, the present invention enables the lateral conveying, systematic off-loading and sequential transferring of articles of variable sizes and shapes from conveyor 10. More importantly, the present invention utilizes the indexing of conveyor 10 and the oscillation of a structural frame means 14, which in turn supports oscillating finger means 18 suspended centrally over carrier means 12, to convey, off-load and sequentially transfer articles. Particularly, conveyor 10 is indexed to provide intermittent movement and conveyance of articles. During the intermittent pause of conveyor 10, the structural frame means 14 is moved from its original position "ii" to position "i". Consequently, the finger means 18 moves a distance equal to the pitch "P". This in turn results in articles being pushed laterally forward a distance equal to the pitch "P". Since each of the finger means 18 are laterally staggered at a lateral length "L", equal to the length of the article to be conveyed, and since the pitch "P" is adjusted to equal the length of the article "C", the article is moved laterally equal to its length. The structural frame means 14 is moved back to its original position "ii" and the conveyor is indexed forward. This sequence is repeated until all the articles are pulsatingly transferred laterally from conveyor 10.

One of the unique aspects of this invention is therefore the use of an indexing conveyor 10 and adjustable oscillating finger means 18 to effectuate a pulsated lateral conveyance, systematic off-loading and sequential transfer of articles of different sizes and shapes. Specifically, this is accomplished by adjusting the lateral distance between the finger means 18 to the size of the article, and coordinating the indexing of conveyor 10 with the oscillation of the structure frame means 14 so that one is at rest while the other is in its motion cycle.

While the significant aspects of the invention have been shown and described with reference to a preferred embodiment, it will be understood by those skilled in the art that variations can be made to the foregoing details without departing from the scope and substance of the invention.

What is claimed is:

1. An apparatus for laterally conveying systematically off-loading and sequentially transferring articles of variable sizes and shapes from a conveyor system comprising:

conveyor means for conveying said articles;
   carrier means secured on said conveyor means supporting said articles thereon;
   structural frame means spaced above said conveyor means;
   oscillation means for oscillating said structural frame means; and
   a plurality of depending finger means, supported by said structural frame means, for urging said articles off said conveyor means along a path different from the path of said conveyor.

2. An apparatus according to claim 1 wherein said carrier means comprises a generally U-shaped cross section.

3. An apparatus according to claim 1 wherein said structural frame means comprises a plurality of internal members.

4. An apparatus according to claim 1 wherein said finger means are adjustably supported by said structural members.

5. An apparatus for laterally conveying, systematically off-loading and sequentially transferring articles of variable sizes and shaped from a conveyor system comprising:

conveyor means for conveying said articles;
   carrier means secured on said conveyor means supporting said articles thereon;
   structural frame means spaced above said conveyor means;
   oscillation means for oscillating said structural frame means;
   a plurality of depending finger means having slidably adjustable connections to members of said structural frame means; and
   means for adjusting the lateral distance between said plurality of finger means.

6. An apparatus according to claim 5 wherein said plurality of finger means comprises means for suspending said finger means substantially perpendicular to said conveyor means.

7. An apparatus according to claim 5 comprising means for moving said plurality of finger means to off-load articles laterally from said conveyor means.

8. A method of laterally conveying, systematically off-loading and sequentially transferring articles of variable sizes and shapes from a conveyor system comprising the steps of:

depositing articles in lateral arrays on a conveyor;
   moving the lateral arrays along the length of said conveyor;
   indexing said conveyor to provide intermittent lengthwise movement of said articles;
   oscillating a structural frame means to provide a pulsating lateral movement of said articles by using depending finger means; and
   adjusting the lateral distance between said finger means, as needed, to off-load articles to different sizes and dimensions.

9. A method according to claim 8 further comprising the steps of adjusting the oscillation of said structural frame means and adjusting the lateral distance between the finger means to cooperate with the indexing of said conveyor based on a given size of articles.

* * * * *